(12) United States Patent
Chao et al.

(10) Patent No.: US 6,370,104 B1
(45) Date of Patent: Apr. 9, 2002

(54) DVD READING-WRITING PICK-UP HEAD EMPLOYING MULTIPLE WAVELENGTHS

(75) Inventors: Zu-Wen Chao; Yuan-Chin Lee, both of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/376,668

(22) Filed: Aug. 16, 1999

(30) Foreign Application Priority Data

Apr. 13, 1999 (TW) .......................................... 88105834

(51) Int. Cl.⁷ ................................................. G11B 7/12
(52) U.S. Cl. ............................. 369/112.28; 369/112.01; 369/110.01
(58) Field of Search ........................... 369/44.11, 44.12, 369/44.14, 44.23, 44.37, 47.1, 53.1, 110.01, 110.04, 112.01, 112.02, 112.09, 112.21, 112.28

(56) References Cited

U.S. PATENT DOCUMENTS

| | | | | |
|---|---|---|---|---|
| 3,643,178 A | * | 2/1972 | Marshall | 372/24 |
| 4,546,463 A | * | 10/1985 | Opheij et al. | 369/112.17 |
| 4,730,297 A | * | 3/1988 | Ishibashi et al. | 369/112.16 |

* cited by examiner

*Primary Examiner*—Muhammad Edun
(74) *Attorney, Agent, or Firm*—W. Wayne Liauh

(57) ABSTRACT

This invention relates to a DVD reading-writing pickup head employing multiple wavelengths for data access on an optical record medium. With the configuration of the pickup head of the present invention, the number of the used optical elements is minimized. The pickup head of the present invention includes a cemented birefringent prism, a plurality of objective lenses, quarter-wavelength plates and laser sources and a photo detector. The cemented birefringent prism is used to refract the laser beams generated by the laser sources into an incident branch and split the laser beams and a reflected branch reflected from the optical record medium.

5 Claims, 3 Drawing Sheets

DVD READING-WRITING PICK-UP HEAD EMPLOYING MULTIPLE WAVELENGTHS

FIELD OF THE INVENTION

The present invention relates to a DVD reading-writing pickup head employing multiple wavelengths, more particularly to a DVD reading-writing pickup head employing a laser source which generates a laser beam with multiple wavelengths.

BACKGROUND OF THE INVENTION

It is known that optical pickup heads are used to record and reproduce information such as video or audio data on and from optical data recording media. As the storage capacity of optical disks is increased, the configuration of pickup heads is also needed to be modified; for example, the wavelength of the laser beam used to read/write data onto optical disks is varied. In the format of the 650 MB CDs, the laser sources with 780 nm wavelength are used. In the format of the 4.7 GB DVD-ROMs, the laser wavelength of the laser sources is 650 nm. In addition, the first generation DVD-R uses the 650 nm-wavelength laser source for reading and the 630 nm-wavelength laser source for writing, and the next generation DVD will use the 410 nm-wavelength laser source.

For the compatibility of the pickup heads for CD and DVD etc., it is necessary that a new pickup head is capable of generating a laser beam with multiple wavelengths for the different disk formats such as the wavelengths 780 nm, 650 nm, 630 nm and 410 nm. FIG. 1 shows a pickup head employing multiple wavelengths according to the related art. A plurality of chromatic beam splitters 90a, 90b and 90c are used to reflect the laser beams with different wavelengths and split the reflected laser beams with different wavelengths onto photo detectors 91a, 91b, 91c and 91d. The configuration of the pickup head of the related art needs a lot of optical elements, and it induces more difficulty of assembly.

SUMMARY OF THE INVENTION

The major objective of the invention is to provide a pickup head employing multiple wavelengths with least optical elements.

Another objective of the present invention is to provide a pickup head employing multiple wavelengths with only one photo detector for transferring optical signals to electric signals.

According to the present invention, a cemented birefringent prism and a plurality of quarter-wave plates for different wavelengths are placed in the light path of the pickup head employing multiple wavelengths. The cemented birefringent prism mixes a plurality of laser beams with different wavelengths and same polarization generated by a plurality of laser sources to an incident laser beam, and splits the incident laser beam and a reflected laser beam from an optical medium such as a CD. With the configuration of the pickup head according to the present invention, the chromatic beam splitters of the related art are not required and only one photo detector is needed.

In the present invention, the cemented birefringent prism consists of two birefringent prisms with optical axes perpendicular to each other, which each birefringent prism is made of double-refraction materials. The cemented birefringent prism of the present invention is one of the Rochon prism and the Sernamont prism. Double-refraction material induces different refraction indices corresponding to different polarizations of incident laser beams. Consequently, a plurality of incident laser beams with same polarization traveling through a cemented birefringent prism with definite incidence angles can be refracted and mixed into an optical branch. In addition, a cemented birefringent prism is used to split laser beams which return from an optical medium to the same detector. The chromatic beam splitters and photo detectors of the related art are replaced with a cemented birefringent prism and a photo detector in the pickup head of the present invention.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
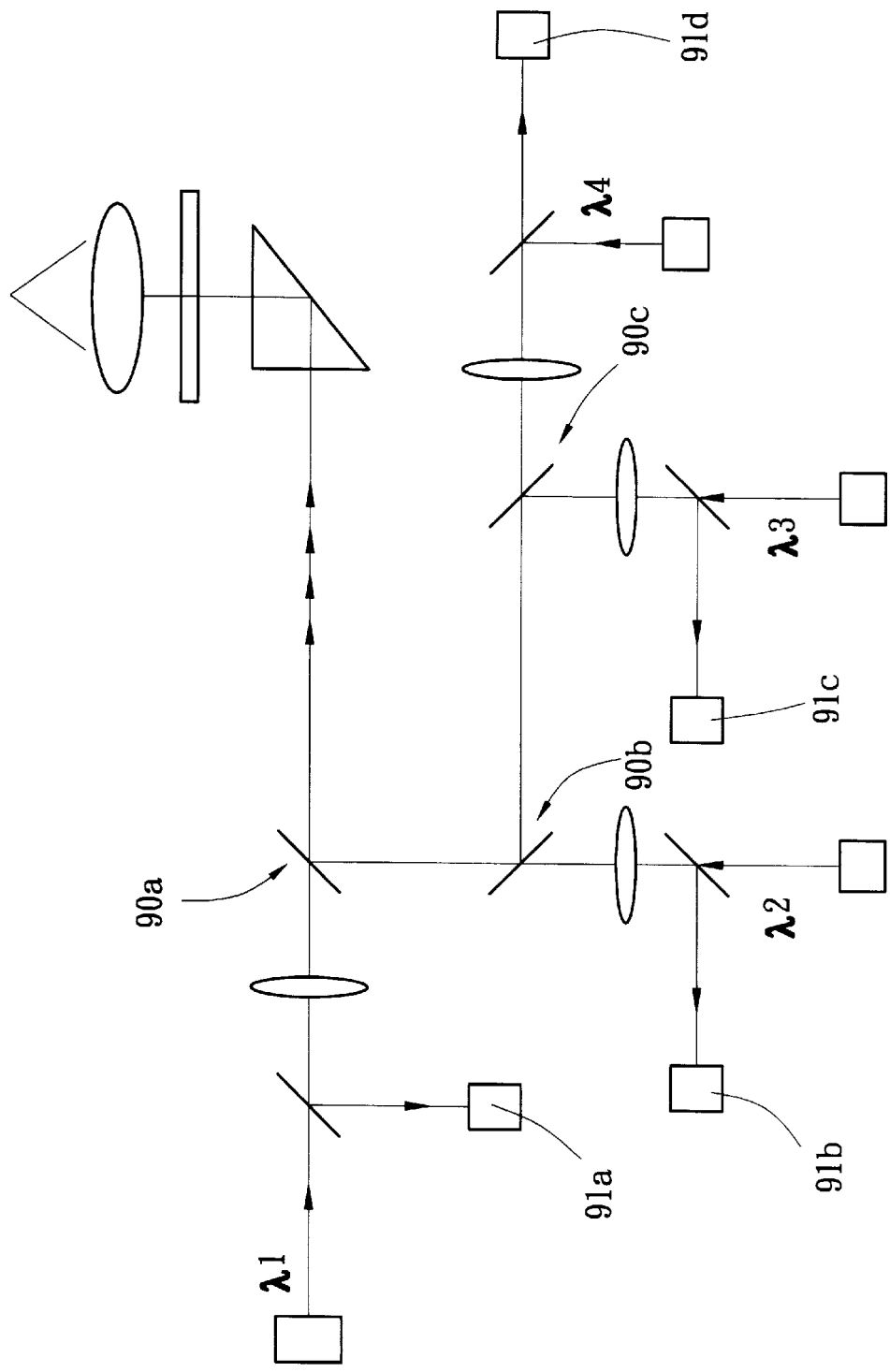
FIG. 1 illustrates the configuration of a pickup head employing multiple wavelengths according to the related art.
Figure 2:
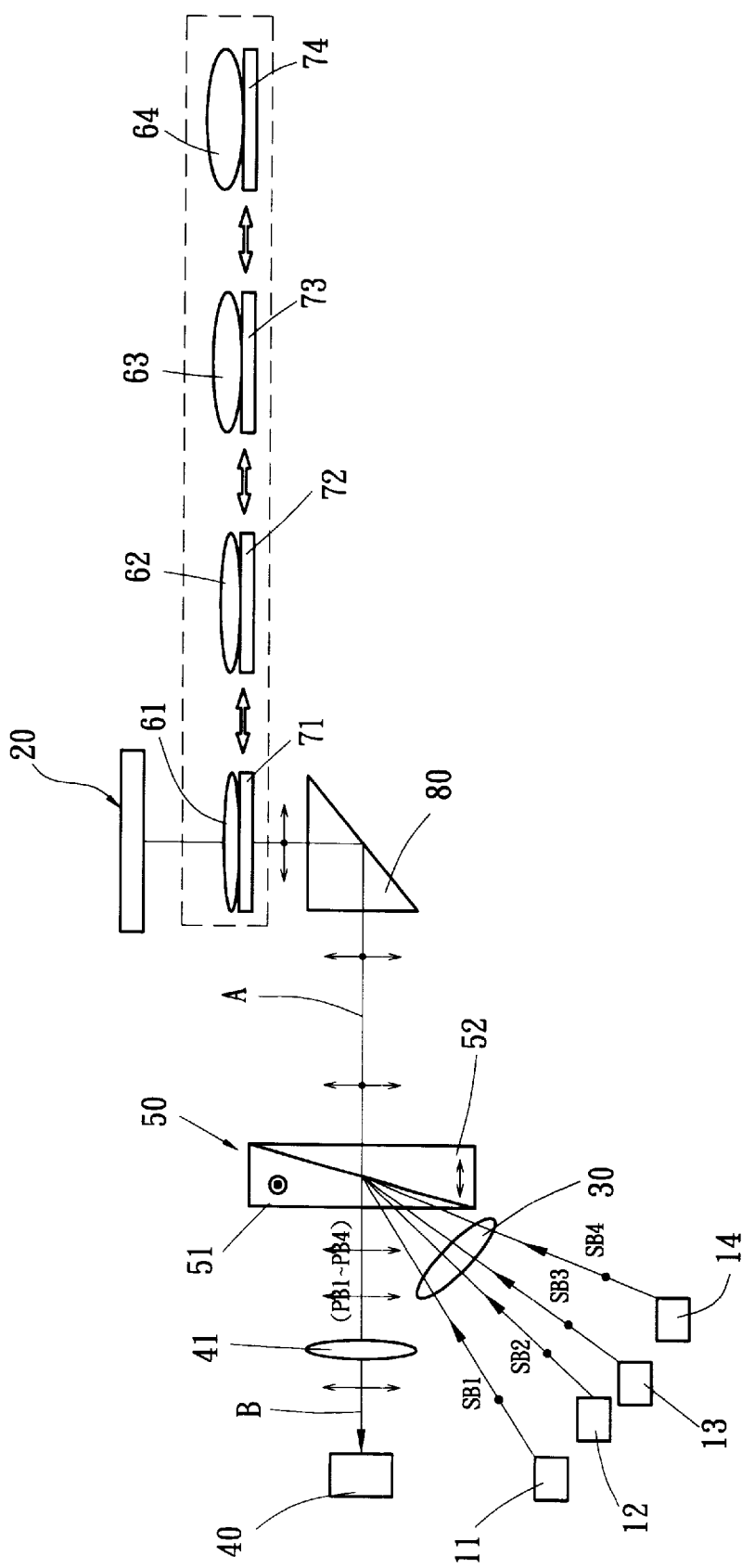
FIG. 2 is an embodiment with a Rochon prism of a pickup head employing multiple wavelengths according to the present invention.

Referring to FIG. 2, a pickup head employing multiple wavelengths with a Rochon prism according to the present invention includes a plurality of laser sources 11~14, a collimator 30, a photo detector 40, a focusing lens 41, a cemented birefringent prism 50, a plurality of objective lenses 61~64, a plurality of quarter-wavelength plates 71~74 and a reflection mirror 80. The laser sources 11~14 are usually laser diodes which each generates a polarized laser beam for data access from an optical record medium 20 (such as CD or DVD). The wavelengths of the laser beams generated by the laser sources 11~14 are different, but their polarizations are in the same direction. The collimator 30 is placed in the light path of the pickup head of the present invention, and is able to collimate the laser beams generated by the laser sources 11~14. The photo detector 40 is used to transfer the optical signals recorded on the optical record medium 20 to electric signals. The focusing lens 41 is placed in the light path of the embodiment is used to focus a laser beam onto the photo detector 40. The cemented birefringent prism 50 is placed in the light path of the pickup head, and it consists of two birefringent prisms 51 and 52 which are made of the same double-refraction material. The cemented birefringent prism 50 of the present invention is called a Rochon prism. The cemented birefringent prism 50 refracts and mixes the laser beams with different wavelengths from the laser sources 11~14 into an incident branch A, and it additionally splits the laser beams from the laser sources 11~14 and a reflected branch B which is a laser beam reflected by the optical record medium 20 and carries optical signals recorded on the optical record medium 20. The objective lenses 61~64 are placed in the light path of the pickup head, and they are used to focus the refracted laser beam A onto the optical record medium 20 corresponding to the wavelengths of incident laser beams. The quarter-wavelength plates 71~74 are adapted with their corresponding objective lenses 61~64, and each is placed in the light path of the pickup head between the cemented birefringent prism 50 and its corresponding objective lens. The quarter-wavelength plates 71~74 are used to change the polarization of an incident laser beam. In the pickup head of the present invention, the function of the quarter-wavelength plates 71~74 are to make the polarizations of the incident branch A and the reflected branch B orthogonal. The reflected mirror 80 is placed in the light path of the pickup head between the quarter-wavelength plates 71~74 and the cemented birefringent prism 50, and it is able to change the traveling direction a laser beam for minimizing the size of the pickup head. The reflection mirror is not functionally necessary for data access.

According to the property of double-refraction material, there are two axes called the fast and slow axes. In addition, both axes are orthogonal and the refraction index on the fast axis is smaller than that on the slow axis. According to the Snell's law, as a wave travels from a medium to another medium having different refraction index, the wave is then refracted with a refraction angle. Hence, two waves with different polarizations traveling through double-refraction material will be refracted with different refraction angles depending on their relative orientation to the optical axis. The cemented birefringent prism 50 uses the above property to split the incident and reflected beam of the pickup head of the present invention. For clear illustration, both axes of the double-refraction material are denoted as S and P which the S axis is orthogonal to the paper and the P axis is parallel to the paper. Here we use a dot in a circle to denote the optical axis to be perpendicular to the paper. And a bidirectional arrow is used to represent the optical axis to be parallel to the paper In FIG. 2, the cemented birefringent prism 50 is a Rochon prism, and the optical axes of both birefringent prisms 51 and 52 are orthogonal. The wavelengths of the laser beams SB1~SB4 with polarization S generated by the laser sources 11~14 are $\lambda 1$, $\lambda 2$, $\lambda 3$ and $\lambda 4$, respectively. The laser beams SB1~SB4 are then collimated by the collimator 30. The collimated laser beams SB1~SB4 then travel through the cemented birefringent prism 50 with different incident angles. As the laser beam SB1 with wavelength $\lambda 1$ and polarization S is used for data access, the laser beam SB1 is first refracted into the incident branch A by the cemented birefringent prism 50 since the refraction indices of birefringent prisms 51 and 52 to the laser beam SB1 are different. Next, the laser beam SB1 travels in order through the reflection mirror 80, the quarter-wavelength plate 71 corresponding to the wavelength $\lambda 1$ and the objective lens 61 corresponding to the quarter-wavelength plate 71. Finally, the laser beam SB1 is focused onto the optical record medium 20. A laser beam carrying optical signals recorded on the optical record medium 20 is reflected into the reflected branch B, and then it travels through the objective lens 61, the quarter-wavelength plate 71 and the cemented birefringent prism 50. After it traveled through the quarter-wavelength plate 71, the laser beam carrying optical signals becomes P-polarization i.e. orthogonal to the polarization S of the laser beam SB1. Because the polarization of the laser beam is perpendicular to the optical axes of birefringent prisms 51, 52, it sees the same refraction indices when passing through the birefringent prisms 50, 51. Hence, the P-polarization laser beam is not refracted by the cemented birefringent prism 50. Finally, the P-polarization laser beam carrying optical signals is focused onto the photo detector 40 by the focusing lens 41, and the optical signals are transferred to electric signals by the photo detector 40 for data reading.

As the laser beam SB2 with wavelength $\lambda 2$ and polarization S is used for data access, the laser beam SB2 is first refracted into the incident branch A by the cemented birefringent prism 50 since the refraction indices of birefringent prisms 51 and 52 to the laser beam SB2 are different. Next, the laser beam SB2 travels in order through the reflection mirror 80, the quarter-wavelength plate 72 corresponding to the wavelength $\lambda 2$ and the objective lens 62 corresponding to the quarter-wavelength plate 72. Finally, the laser beam SB2 is focused onto the optical record medium 20. A laser beam carrying optical signals recorded on the optical record medium 20 is reflected into the reflected branch B, and then it travels through the objective lens 62, the quarter-wavelength plate 72 and the cemented birefringent prism 50. After it traveled through the quarter-wavelength plate 72, the laser beam carrying optical signals becomes P-polarization i.e. orthogonal to the polarization S of the laser beam SB2. Because the polarization of the laser beam is perpendicular to the optical axes of birefringent prisms 51, 52, it sees the same refraction indices when passing through the birefringent prisms 50, 51. Hence, the P-polarization laser beam is not refracted by the cemented birefringent prism 50. Finally, the P-polarization laser beam carrying optical signals is focused onto the photo detector 40 by the focusing lens 41, and the optical signals are transferred to electric signals by the photo detector 40 for data reading.

Similarly, as the laser beam SB3 (or SB4) with wavelength $\lambda 3$ (or $\lambda 4$) and polarization S is used for data access, the laser beam SB3 (or SB4) is first refracted into the incident branch A by the cemented birefringent prism 50 since the refraction indices of both birefringent prisms 51 and 52 to the incident laser beam SB3 (or SB4) are different. Next, the laser beam SB3 (or SB4) travels in order through the reflection mirror 80, the quarter-wavelength plate 73 (or 74) corresponding to the wavelength $\lambda 3$ (or $\lambda 4$) and the objective lens 63 (or 64) corresponding to the quarter-wavelength plate 73 (or 74). Finally, the laser beam SB3 (or SB4) is focused onto the optical record medium 20. A laser beam carrying optical signals recorded on the optical record medium 20 is reflected into the reflected branch B, and then it travels through the objective lens 63 (or 64), the quarter-wavelength plate 73 (or 74) and the cemented birefringent prism 50. After it traveled through the quarter-wavelength plate 73 (or 74), the laser beam carrying optical signals becomes P-polarization i.e. orthogonal to the polarization S of the laser beam SB3 (or SB4). Similar to SB1, SB2, it sees the same refraction indices when passing through the birefringent prisms 50, 51. Hence, the P-polarization laser beam is not refracted by the cemented birefringent prism 50. Finally, the P-polarization laser beam carrying optical signals is focused onto the photo detector 40 by the focusing lens 41, and the optical signals are transferred to electric signals by the photo detector 40 for data reading.

As the pickup head of the present invention is used for data recording, the light path of the pickup head is same as that for data reading mentioned above. The difference of both operations is that the laser beam is modulated according to the output signals of a function generator during the data recording operation. The modulated laser beam hence changes the physical property of the optical record medium 20 to record data.

In order to access data from optical record media with different formats, it is necessary to select a laser source with wavelength corresponding to the format of the optical record medium which is requested. Consequently, the quarter-wavelength plate and the objective lens are also dependent on the wavelength of the laser beam for data access, i.e. dependent on the format of the requested optical record medium.

Figure 3:
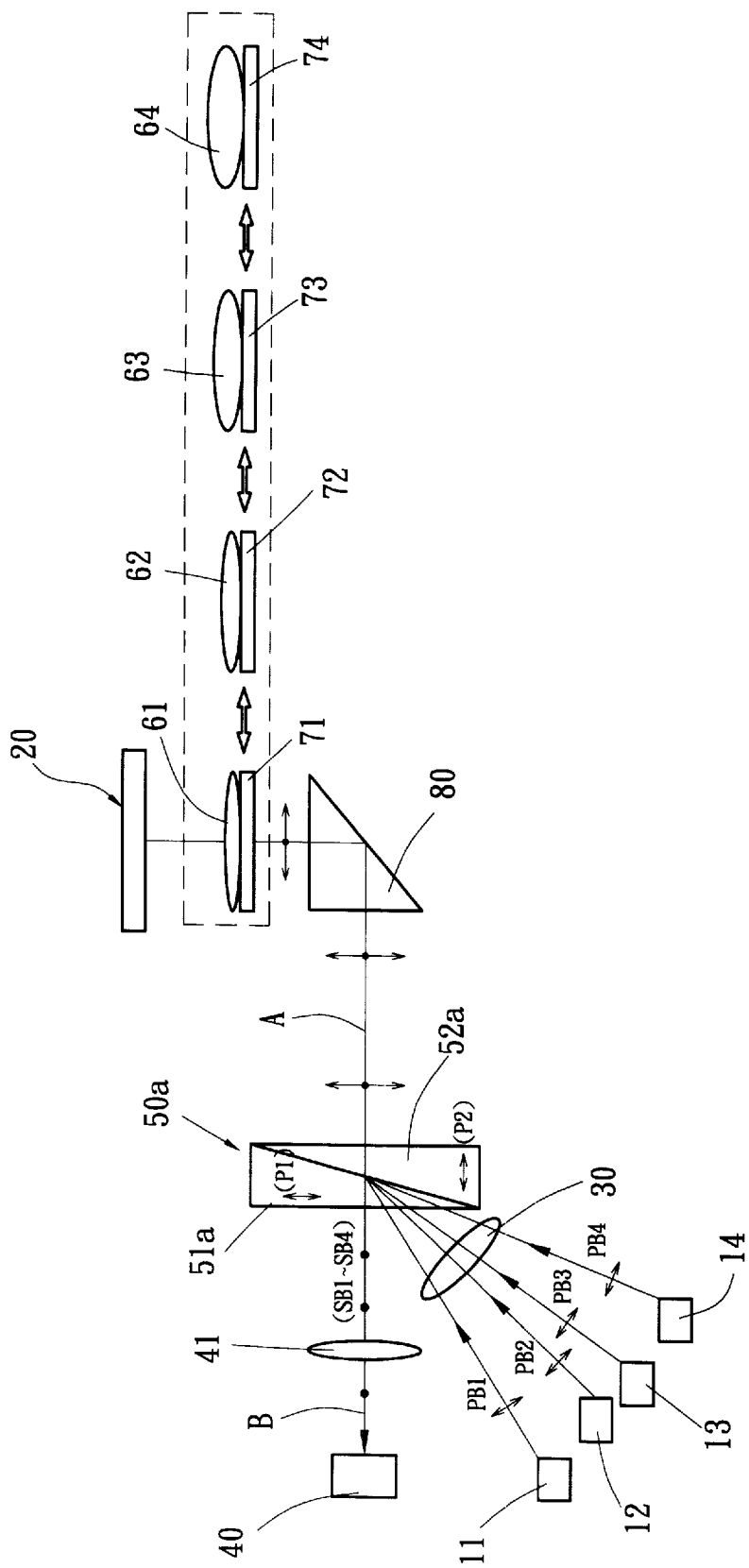
FIG. 3 is an embodiment with a Sernarmont prism of a pickup head employing multiple wavelengths according to the present invention.

Referring to FIG. 3, another embodiment of a pickup head employing multiple wavelengths with a Sernarmont prism according to the present invention is shown. The configuration of the present embodiment is the same as the first one. The only difference of both embodiments is that the cemented birefringent prism 50a of the present embodiment is a Sernarmont prism which consists of two birefringent prisms 51a and 52a with orthogonal optical axes P1 and P2, respectively. Besides, both optical axes are parallel to the paper. The operation of the pickup head with the Sernarmont prism is similar to the first embodiment. The different step of the reading operation of this embodiment is described as follows. Since the incident angles of the P-polarization laser beams PB1~PB4 generated by the laser sources are different, the cemented birefringent prism 50a first refracts the laser beams PB1~PB4 into an incident branch A. After the reflected laser beams PB1~PB4 travel through the quarter-wavelength plates 71~74, their polarizations are changed to be S-polarization i.e. orthogonal to the polarization P of the incident laser beams PB1~PB4, respectively. Because the polarization of the laser beams are perpendicular to the optical axes of birefringent prisms 51a, 52a. Hence, the S-polarization laser beams SB1~SB4 are not refracted by the cemented birefringent prism 50a. Finally, the S-polarization laser beams SB1~SB4 are focused onto the photo detector 40 by the focusing lens 41, and the optical signals are transferred to electric signals by the photo detector 40 for data reading.

With the pickup heads of the present invention, the number of the optical devices used in the pickup heads is reduced without losing the functions of the pickup head of relatedart. Hence, the cost and complexity of the pickup head according to the present invention is vastly decreased.

It is noted the DVD reading-writing pickup heads employing multiple wavelengths described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. An optical pickup head employing multiple wavelengths for data access from an optical record medium, comprising:

a plurality of laser sources generating linearly polarized laser beams with different wavelengths;

a cemented birefringent prism located on the light path of said optical pickup head, consisting of two birefringent prisms made of double-refraction material, for refracting said linearly polarized laser beams into an incident branch and splitting any of said laser beams and a reflected branch reflected from said optical record medium;

a plurality of objective lenses located on the light path of said optical pickup head for focusing said laser beams onto said optical record medium;

a plurality of quarter-wavelength plates arranged one-by-one corresponding to said objective lenses for making the polarizations of said incident branch and said reflected branch orthogonal, each located on the light path of said optical pickup head between said cemented birefringent prism and said corresponding objective lens; and a photo detector located on the light path of said optical pickup head for transferring the optical signals of said reflected branch to electric signals.

2. The optical pickup head employing multiple wavelengths as claimed in claim 1 wherein said cemented birefringent prism is a Rochon prism.

3. The optical pickup head employing multiple wavelengths as claimed in claim 1 wherein said cemented birefringent prism is a Sernarmont prism.

4. The optical pickup head employing multiple wavelengths as claimed in claim 1 further comprising a collimator located on the light path of said optical pickup head for collimating said laser beams.

5. The optical pickup head employing multiple wavelengths as claimed in claim 1 further comprising a focusing lens located on the light path of said optical pickup head for focusing said reflected branch onto said photo detector.

* * * * *